United States Patent
Fujii

(10) Patent No.: US 12,046,830 B2
(45) Date of Patent: Jul. 23, 2024

(54) ANTENNA DEVICE AND FEED DEVICE

(71) Applicant: MINEBEA MITSUMI Inc., Nagano (JP)

(72) Inventor: Masaaki Fujii, Shizuoka (JP)

(73) Assignee: MINEBEA MITSUMI Inc., Nagano. (JP)

( * ) Notice: Subject to any disclaimer, the term of this patent is extended or adjusted under 35 U.S.C. 154(b) by 364 days.

(21) Appl. No.: 17/310,560

(22) PCT Filed: Nov. 5, 2019

(86) PCT No.: PCT/JP2019/043255
§ 371 (c)(1),
(2) Date: Aug. 11, 2021

(87) PCT Pub. No.: WO2020/170508
PCT Pub. Date: Aug. 27, 2020

(65) Prior Publication Data
US 2022/0021112 A1  Jan. 20, 2022

(30) Foreign Application Priority Data
Feb. 20, 2019 (JP) ................................. 2019-028376

(51) Int. Cl.
*H01Q 3/02* (2006.01)
*H01Q 3/26* (2006.01)
(Continued)

(52) U.S. Cl.
CPC ............. *H01Q 3/2676* (2013.01); *H01Q 3/36* (2013.01); *G06T 7/73* (2017.01);
(Continued)

(58) Field of Classification Search
CPC .......... H01Q 3/2676; H01Q 3/36; H01Q 3/30; H01Q 3/38; G06T 7/73
(Continued)

(56) References Cited

U.S. PATENT DOCUMENTS 5,185,667 A   2/1993   Zimmermann
5,313,306 A   5/1994   Kuban et al.
(Continued)

FOREIGN PATENT DOCUMENTS

CN   101919116   12/2010
CN   104011767   8/2014
(Continued)

OTHER PUBLICATIONS

International Search Report of Int. Appl. No. PCT/JP2019/043255 dated Dec. 24, 2019.
(Continued)

*Primary Examiner* — Chuong P Nguyen
(74) *Attorney, Agent, or Firm* — IPUSA, PLLC

(57) ABSTRACT

An antenna device and a feed device that allows a beam direction to be adjusted with a simple calculation are provided.
An antenna device includes an array antenna with multiple antenna elements that are arranged in two dimensions, multiple antenna elements being arranged along each of a first axis and a second axis. The antenna device includes at least one phase adjusting unit configured to adjust, with respect to a first axial direction, a phase of power supplied to each of the multiple antenna elements. The antenna device includes an image capturing unit configured to capture an image through a fisheye lens. The antenna device includes a position converting unit configured to convert a first position, which is used in the image capturing unit, of a marker included in the image captured by the image capturing unit, into a second position of polar coordinates on a first plane that includes the first axis and the second axis. The antenna device includes an elevation-angle acquiring unit configured to determine, within a second plane that includes the first axis and a third axis, an elevation angle of a projected
(Continued)

position relative to the third axis, based on the second position, the projected position being obtained by projecting the first position onto the second plane. The antenna device includes a control unit configured to control the phase adjusting unit such that a direction of a beam radiated through the array antenna is derived from the elevation angle within the second plane.

7 Claims, 3 Drawing Sheets

(51) Int. Cl.
*H01Q 3/36* (2006.01)
*G06T 7/73* (2017.01)
*H01Q 3/30* (2006.01)
*H01Q 3/38* (2006.01)

(52) U.S. Cl.
CPC ...... *G06T 2207/30204* (2013.01); *H01Q 3/30* (2013.01); *H01Q 3/38* (2013.01)

(58) Field of Classification Search
USPC .................................................. 342/372, 377
See application file for complete search history.

(56) References Cited

U.S. PATENT DOCUMENTS

| | | | | |
|---|---|---|---|---|
| 7,064,710 | B1 * | 6/2006 | Ksienski | H01Q 3/26 342/372 |
| 10,056,674 | B2 | 8/2018 | Hirabe | |
| 2009/0289864 | A1 | 11/2009 | Derneryd et al. | |
| 2010/0295729 | A1 | 11/2010 | Nogami | |
| 2014/0314336 | A1 | 10/2014 | Yagi et al. | |
| 2016/0078590 | A1 | 3/2016 | Aoki et al. | |
| 2017/0343677 | A1 | 11/2017 | Capet et al. | |
| 2017/0353669 | A1 | 12/2017 | Hayashi | |
| 2018/0180741 | A1 | 6/2018 | Capet et al. | |
| 2019/0012766 | A1 | 1/2019 | Yoshimi | |
| 2023/0088273 | A1 * | 3/2023 | Fujii | H02J 50/30 307/104 |
| 2024/0072577 | A1 * | 2/2024 | Fujii | H02J 50/90 |

FOREIGN PATENT DOCUMENTS

| | | | | |
|---|---|---|---|---|
| CN | 105324791 | | 2/2016 | |
| CN | 107211114 | | 9/2017 | |
| CN | 107436442 | | 12/2017 | |
| CN | 107911789 | | 4/2018 | |
| CN | 108226963 | | 6/2018 | |
| EP | 3249429 | | 11/2017 | |
| JP | H10-163721 | | 6/1998 | |
| JP | 2006-222920 | | 8/2006 | |
| JP | 2008-523708 | | 7/2008 | |
| JP | 2008-311890 | | 12/2008 | |
| JP | 2012-204955 | | 10/2012 | |
| JP | 2013-120086 | | 6/2013 | |
| JP | 2018-142941 | | 9/2018 | |
| WO | 2014/045495 | | 3/2014 | |
| WO | WO-2022054586 | A1 * | 3/2022 | .............. H02J 50/23 |
| WO | WO-2022264613 | A1 * | 12/2022 | .............. H01Q 3/36 |
| WO | WO-2023013160 | A1 * | 2/2023 | .............. H02J 50/90 |

OTHER PUBLICATIONS

Extended European Search Report mailed on Feb. 7, 2022 with respect to the corresponding European patent application No. 19915858.5.
Freking Jacob A: "Computer Vision Control for Phased Array Beam Steering", May 23, 2018 (May 23, 2018), pp. 1-25, XP055883064, Retrieved from Internet: URL: https://hdl.handle.net/1969.1/166457.
Office Action mailed Apr. 1, 2024 with respect to the corresponding Chinese patent application No. 201980092201.X.
Wang Jing, "Design of Graident Index Metamaterial-Based Lens Antenna—A thesis submitted to Xidian University in partial fulfillment of the requirements for the degree of Master in Electronics and Communication Engineering" (Nov. 2014) (With English Abstract).
Gao, Fei, "The Study of Near-Field Focusing and Synthesis, Wideband Tunable Reflection Phase Shifter, and CTS Antenna—A dissertation submitted to Xidian University in partial fulfillment of the requirements for the degree of Doctor of Philosophy" (Apr. 2015) (With English Abstract).
Zhao-Len Chen et al., "Artificial Maxwell Fisheye Lens Design and Synthesis with Using Metasurface Structure", Dec. 28, 2015.

* cited by examiner

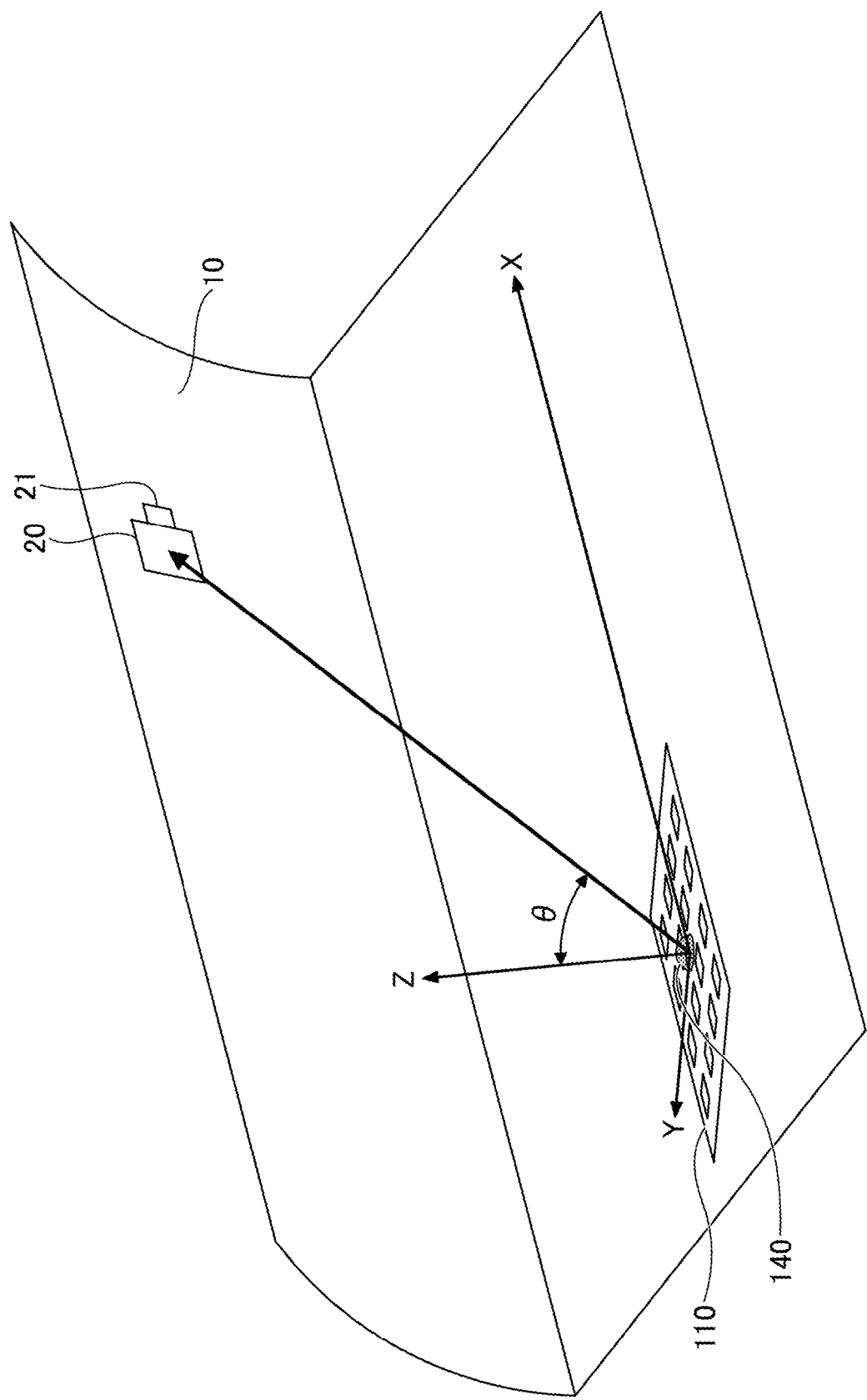

ANTENNA DEVICE AND FEED DEVICE

TECHNICAL FIELD

The present invention relates to an antenna device and a feed device.

BACKGROUND

The conventional antenna device includes antenna sections each of which has multiple antenna elements arranged in an array pattern or subarray pattern (see, for example, Patent document 1).

CITATION LIST

Patent Document

[Patent document 1] Published Japanese Translation of PCT International Application No. 2008-523708

SUMMARY

In order to adjust directions of beams formed by radio waves that are emitted from multiple antenna elements, when the directions of the beams are adjusted using elevation angles and azimuth angles, it may involve complicated calculations.

Accordingly, an object is to provide an antenna device and a feed device that allows a beam direction to be adjusted with a simple calculation.

An antenna device according to an embodiment of the present invention includes an array antenna with multiple antenna elements that are arranged in two dimensions, the multiple antenna elements being arranged along each of a first axis and a second axis. The antenna device includes at least one phase adjusting unit configured to adjust, with respect to a first axial direction, a phase of power supplied to each of the multiple antenna elements. The antenna device includes an image capturing unit configured to capture an image through a fisheye lens. The antenna device includes a position converting unit configured to convert a first position, which is used in the image capturing unit, of a marker included in the image captured by the image capturing unit, into a second position of polar coordinates on a first plane that includes the first axis and the second axis. The antenna device includes an elevation-angle acquiring unit configured to determine, within a second plane that includes the first axis and a third axis, an elevation angle of a projected position relative to the third axis, based on the second position, the projected position being obtained by projecting the first position onto the second plane. The antenna device includes a control unit configured to control the phase adjusting unit such that a direction of a beam radiated through the array antenna is derived from the elevation angle within the second plane.

Advantageous Effects of Invention

An antenna device and a feed device that allows a beam direction to be adjusted with a simple calculation are provided.

BRIEF DESCRIPTION OF DRAWINGS

FIG. 3 is a diagram illustrating an example of how the feed device 100 is applied.

DESCRIPTION OF EMBODIMENTS

One or more embodiments in which an antenna device and a feed device according to the present invention are applied are described below.

<Embodiment>

Figure 1:
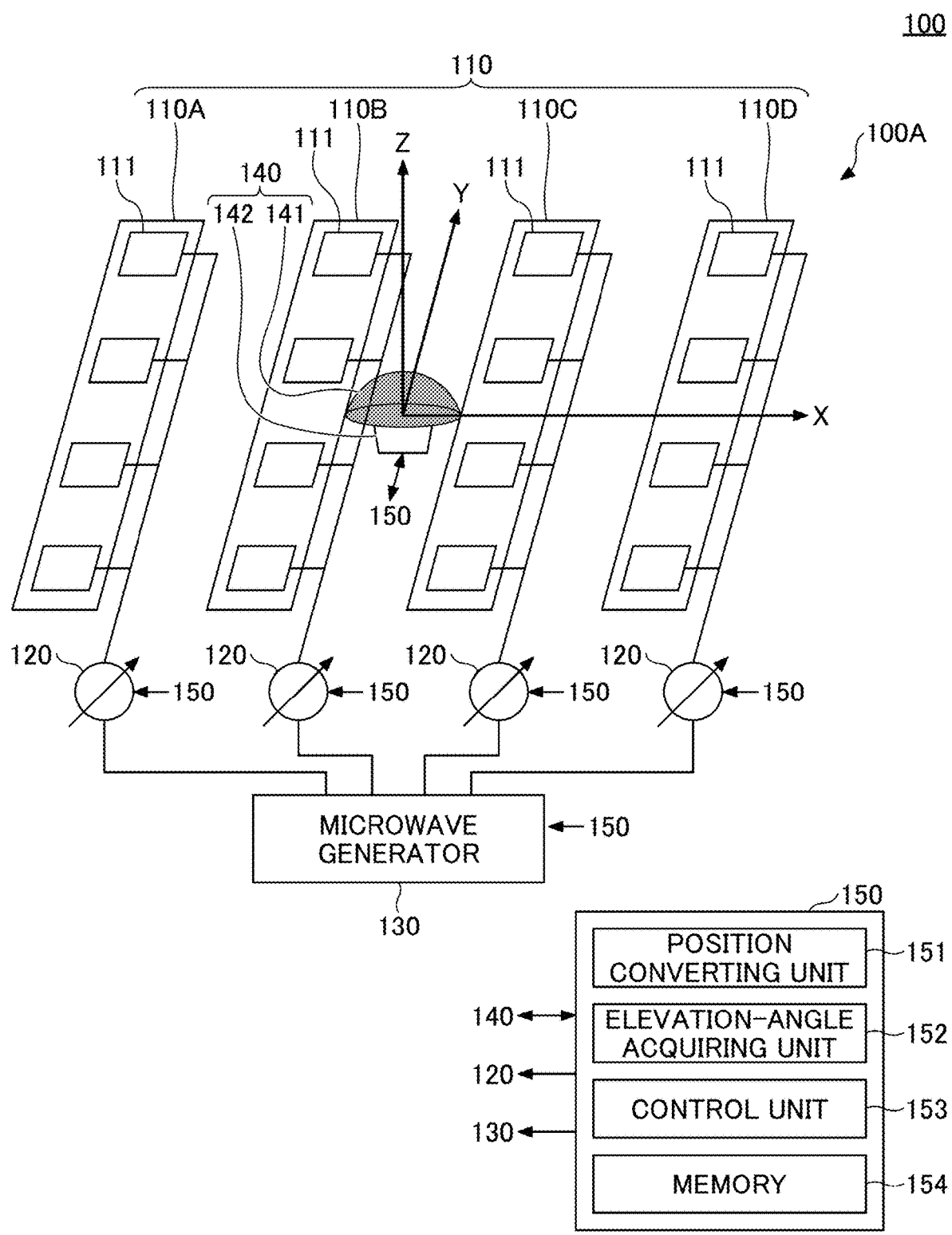
FIG. 1 is a diagram illustrating a feed device 100 according to an embodiment.

FIG. 1 is a diagram illustrating a feed device 100 according to an embodiment. The feed device 100 includes an array antenna 110, phase shifters 120, a microwave generator 130, a camera 140, and a controller 150. An antenna device 100A according to the embodiment includes components of the feed device 100 excepting the microwave generator 130.

In the following description, an XYZ coordinate system is used. A plan view means a view seen from an XY plane. An X-axis is an example of a first axis, a Y-axis is an example of a second axis, and a Z-axis is an example of a third axis. The XY plane is an example of a first plane, and an XZ plane is an example of a second plane.

As an example, the array antenna 110 includes a group of four subarrays 110A, 110B, 110C, and 110D. The subarrays 110A to 110D are ranged in an X-axis direction, and each of the subarrays 110A to 110D may include four antenna elements 111, for example. In this case, for example, the array antenna 110 includes sixteen antenna elements 111. Each antenna element 111 is a rectangular patch antenna in a plan view. The array antenna 110 may have a ground plate that is set at a ground potential and that is on the −Z direction side of the antenna elements 111. Note that for example, a center determined based on positions of the sixteen antenna elements 111 coincides with the origin of the XYZ coordinate system.

Four phase shifters 120 are respectively provided for the four subarrays 110A to 110D, and each of the four phase shifters 120 is connected to given antenna elements 111 of a corresponding subarray among the subarrays 110A to 110D. In each of the subarrays 110A to 110D, four antenna elements 111 are connected in parallel to a corresponding one phase shifter 120. Each phase shifter 120 is an example of a phase adjusting unit.

In each of the subarrays 110A to 110D, power having the same phase is supplied to each of the four antenna elements 111. Also, power output from the respective four phase shifters 120 to the subarrays 110A to 110D differs from each other in phase. Thus, an angle (elevation angle) of a beam formed by radio waves radiated from the sixteen antenna elements 111 can be adjusted within the XZ plane.

A beam output from the array antenna 110 is as described in the beam formed by the radio waves radiated from the sixteen antenna elements 111. Also, a beam output from each of the antenna device 100A and the feed device 100 is as described in the beam output from the array antenna 110.

The microwave generator 130 is connected to each of the four phase shifters 120 and supplies microwaves of predetermined power. The microwave generator 130 is an example of a radio wave generator. For example, a microwave frequency is 915 MHz. Note that in this description, the feed device 100 has the configuration that includes the microwave generator 130. However, the microwave is not limiting, and a radio wave of a predetermined frequency may be used.

The camera 140 is disposed between the subarray 110B and the subarray 110C. The camera 140 includes a fisheye lens 141 and a camera body 142. The camera 140 is an example of an image capturing unit.

The fisheye lens 141 is a lens employing an equidistant projection. For example, a center of the fisheye lens 141 coincides with each of the above center determined from the sixteen antenna elements 111 and the origin of the XYZ coordinate system. The camera body 142 is a portion of the camera 140 other than the fisheye lens 141. The camera may be either a camera with a complementary metal oxide semiconductor (CMOS) image sensor or an infrared camera.

The camera 140 captures an image with a marker, through the fisheye lens 141, and outputs image data to the controller 150. The marker is attached to a target, to which each of the antenna device 100A and the feed device 100 outputs a beam. Each of the antenna device 100A and the feed device 100 determines a position of the marker included in a given image captured by the camera 140, and then irradiates the target with a beam.

The controller 150 includes a position converting unit 151, an elevation-angle acquiring unit 152, a control unit 153, and a memory 154. The controller 150 is implemented by a computer including a central processing unit (CPU) and a memory. The position converting unit 151, the elevation-angle acquiring unit 152, and the control unit 153, which are functionally implemented by a program that the controller 150 executes, are illustrated using respective functional blocks. The memory 154, which is a memory of the controller 150, is functionally illustrated.

Figure 2:
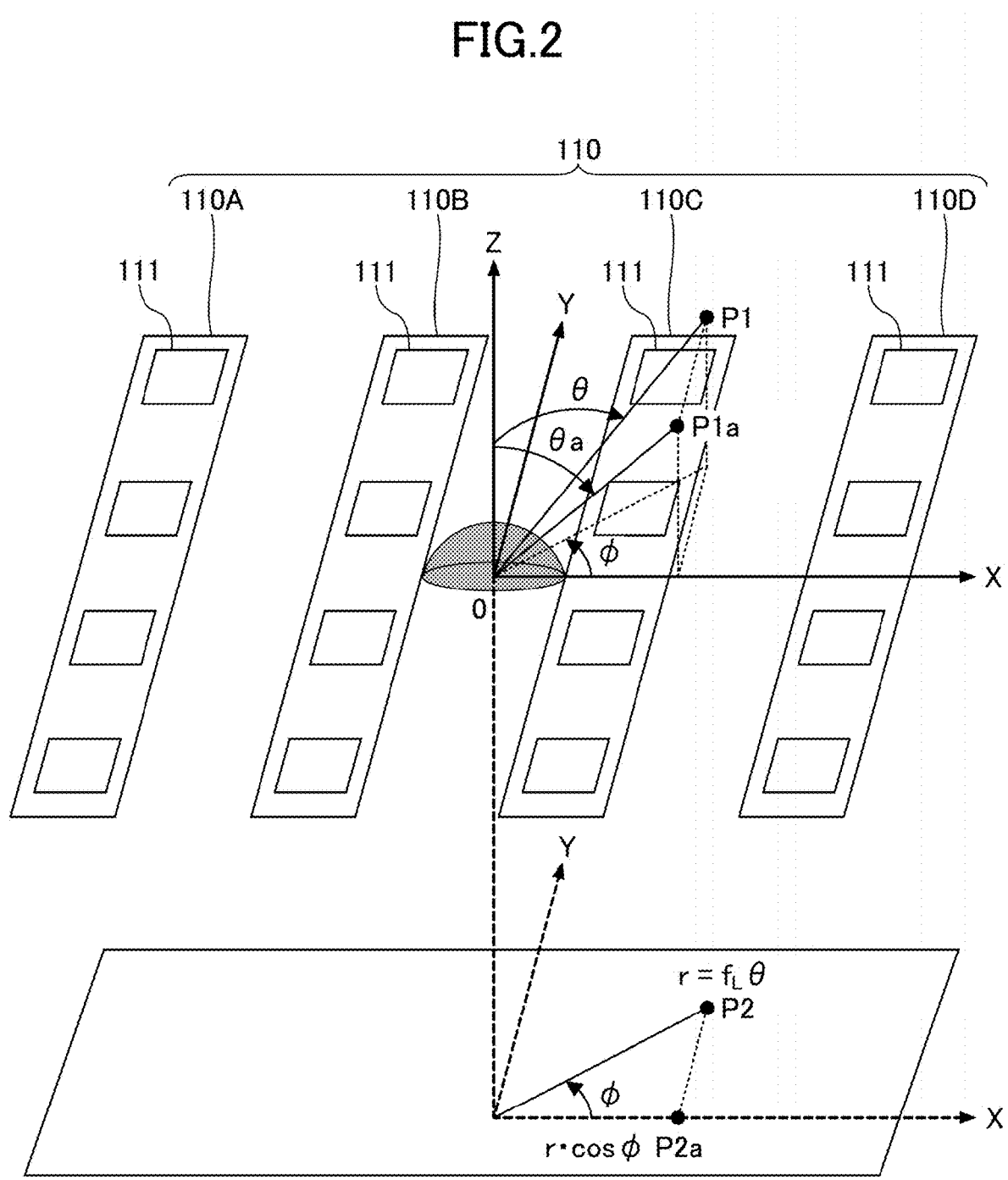
FIG. 2 is a diagram illustrating a polar coordinate system used in an array antenna 110.

Hereafter, the position converting unit 151, the elevation-angle acquiring unit 152, the control unit 153, and the memory 154 will be described with reference to FIG. 2 together with FIG. 1. FIG. 2 is a diagram illustrating a polar coordinate system used in the array antenna 110. In FIG. 2, only the array antenna 110 and the camera 140 of the feed device 100 are illustrated. Also, in FIG. 2, the polar coordinate system in a plane parallel to the XY plane is illustrated.

Moreover, a position of the marker in the XYZ coordinate system is expressed by P1, an elevation angle associated with a line segment connecting the origin O and the position P1 is expressed by $\theta$, and an azimuth angle is expressed by $\varphi$. The elevation angle is an angle from the +Z direction, the azimuth angle is an angle from the +X direction, and a counterclockwise direction in a plan view is expressed using a positive value. An elevation angle associated with a line segment connecting a position P1$a$, which is obtained by projecting the position P1 onto the XZ plane, and the origin O, is expressed by $\theta a$.

The position P1 is an example of a first position, and the position P1$a$ is an example of a projected position. The origin O is an example of a reference point in the XYZ coordinate system.

Each of the antenna device 100A and the feed device 100 adjusts, within only the XZ plane, a given elevation angle of a beam that the array antenna 110 outputs. In this regard, it is assumed that a given position of the target is not greatly displaced from the XZ plane (e.g., the given elevation angle from the Z-axis, within the YZ plane, is approximately within the range of ±30 degrees, inclusive). This is because when the given target is at such a position, the beam can be delivered to the given target by simply adjusting the elevation angle of the beam within the XZ plane.

The position converting unit 151 performs image processing with respect to an image captured by the camera 140, to thereby convert coordinates of the image to which an equidistant projection is applied and that is obtained through the fisheye lens 141, into polar coordinates on a plane parallel to the XY plane. By the image processing, the position P1, which is used in the array antenna 110, of the marker included in the image captured by the camera 140 is converted into a position P2 expressed in polar coordinates on the XY plane. The position P2 is an example of a second position.

The position P2 is expressed with a radius r from the origin O, and a deflection angle $\varphi$. When a focal length of the fisheye lens 141 is given as $f_L$, the radius r is expressed by $r=f_L\theta$. The deflection angle $\varphi$ is identical to the azimuth angle $\varphi$. The position converting unit 151 calculates r·cos $\varphi$ indicating that the radius r is mapped to the X-axis, by the above-described image processing.

The elevation-angle acquiring unit 152 acquires (determines), as the elevation angle $\theta a$, a value (r·cos $\varphi/f_L$) obtained by dividing an X-coordinate (r·cos $\varphi$) of a mapped position P2$a$, by the focal length $f_L$ of the fisheye lens 141, where the mapped position P2$a$ is obtained by mapping the position P2 to the X-axis. The reason why the elevation angle $\theta a$ can be obtained in such a manner will be described below.

The control unit 153 controls the phase shifters 120 such that a given direction of the beam emitted from the array antenna 110 is derived from the elevation angle $\theta a$ within the XZ plane. The elevation angle $\theta a$ is obtained by the elevation-angle acquiring unit 152. The control unit 153 performs an output control of the microwave generator 130, an imaging control of the camera 140, and the like.

The memory 154 stores a program to be executed when the position converting unit 151, the elevation-angle acquiring unit 152, and the control unit 153 perform processing. The memory 154 stores data such as data to be used when the program is executed, data to be generated when the program is executed, and image data that the camera 140 acquires.

Hereafter, a method for determining the elevation angle $\theta a$ will be described.

When the azimuth angle $\varphi$ and the elevation angle $\theta$ are used, the elevation angle $\theta a$ can be determined, as expressed by Equation (1) below, by taking into account the geometric relationship between the position P1 and the position P1$a$.

[Math. 1]

[Math. 1]

$$\theta a = \frac{\pi}{2} - \tan^{-1}\left\{\frac{1}{\cos\phi}\tan\left(\frac{\pi}{2} - \theta\right)\right\} \quad (1)$$

When Equation (1) is expanded, Equation (2) is obtained.

[Math. 2]

$$\tan \theta a = \cos \phi \tan \theta \quad (2)$$

Here, if the elevation angle $\theta$ is sufficiently small, "tan $\theta \approx \theta$" is satisfied; if the azimuth angle $\varphi$ is sufficiently small, "cos $\varphi \approx 1$" is satisfied; and, if the azimuth angle $\varphi$ is close to 90 degrees, "cos $\varphi \approx 0$" is satisfied, accordingly, then Equation (2) can be transformed into Equation (3).

[Math. 3]

$$\theta a = \theta \cos \phi \quad (3)$$

In other words, if the position of a given target is not displaced greatly from the XZ plane, the elevation angle $\theta a$ can be approximated as expressed by Equation (3).

Further, as described above, when the focal length $f_L$ of the fisheye lens 141 is given as $f_L$, the radius r is expressed by Equation (4) below.

$$r = f_L \theta \quad (4)$$

From Equation (3) and Equation (4), the elevation angle θa can be expressed by Equation (5) below.

$$\theta a = r \cdot \cos \varphi / f_L \quad (5)$$

Thus, the elevation angle Ga can be approximated using Equation (5).

As described above, when a given elevation angle of the beam from the array antenna 110 is adjusted within only the XZ plane, the position P2 is calculated by converting coordinates of the position P1, which are obtained by an equidistance projection, into polar coordinates on a plane parallel to the XY plane, and further, an X-coordinate (r·cos φ) of a given protected position P2a is divided by the focal length $f_L$ of the fisheye lens 141, where the given projected position P2a is obtained by mapping the position P2 to the X axis. Thus, the elevation angle θa (=r·cos φ/$f_L$) can be determined.

Accordingly, an antenna device 100A and a feed device 100 that allows a beam direction to be adjusted with a simple calculation can be provided.

Also, each of the antenna device 100A and the feed device 100 adjusts a given elevation angle of the beam output from the array antenna 110, within only the XZ plane, and thus the number of phase shifters 120 is one-fourth of the number of phase shifters in a case where the elevation angle is adjusted within both the XZ plane and the YZ plane. Accordingly, the antenna device 100A and the feed device 100 can be inexpensively implemented.

Note that in the above description, the center of the fisheye lens 141 coincides with the center determined from the sixteen antenna elements 111. However, the center of the fisheye lens 141 may be displaced from the above center of the sixteen antenna elements 111. In this case, a coordinates origin used in determining the phase for controlling the array antenna may be displaced by an amount of displacement.

FIG. 3 is a diagram illustrating an example of how the feed device 100 is applied. For example, the feed device 100 is provided in a vehicle, and a target antenna 20 is provided on an inner wall 10 of a tunnel. A marker 21 is attached to the antenna 20. The marker 21 includes a retroreflective reflector, a mirror ball, or the like.

When the vehicle travels in the +X direction, the camera 140 is used to convert coordinates of a position of the marker 21 into polar coordinates in a plane parallel to an XY plane, and then a beam is delivered to the antenna 20 by using a given elevation angle θa (=r·cos φ/$f_L$), which is determined by dividing an X-coordinate (r·cos φ) of a mapped position (mapped position corresponding to P2a), by the focal length $f_L$ of the fisheye lens 141, where the mapped position is obtained by mapping the position of the polar coordinates onto the X-axis.

For example, the antenna 20, a sensor, a rectenna, and a wireless communication module are secured to a fixing portion for fixing an infrastructural object, such as a jet fan or a sign, to the inner wall 10 of the tunnel, where the facility object is attached to the inner wall 10 of the tunnel, and the sensor monitors loosening of a bolt or the like used at the fixing portion. In such a manner, when the feed device 100 irradiates the antenna 20 with a beam, while the vehicle is traveling, the rectenna connected to the antenna 20 generates power to thereby cause the wireless communication module to start. Then, the wireless communication module radiates a signal indicating the output of the sensor, and the signal is thereby received on the vehicle side. Thus, a fixed state of the infrastructural object can be inspected while the vehicle is traveling.

In this case, a given signal indicating the output of the sensor, which is radiated by the wireless communication module, may be received through the array antenna 110.

Also, a given X-coordinate (r·cos φ) of a given mapped position (mapped position corresponding to P2a) is determined by mapping a given position of the antenna 20, which is shifted from the XZ plane, to the X-axis, and then a beam is adjusted by using a given value (r·cos φ/$f_L$) obtained by dividing the given X-coordinate (r·cos φ) by the focal length $f_L$ of the fisheye lens 141, where the given value (r·cos φ/$f_L$) is used as a given elevation angle θa. Thus, even when the vehicle traveling in the X-axis direction shifts toward either a positive side or negative side of the Y-axis, displacement due to the shift is reduced, thereby enabling the given elevation angle θa to be determined.

In this description, the case where the feed device 100 (antenna device 100A) communicates with the wireless communication module provided on the inner wall 10 of the tunnel has been described with reference to FIG. 3. However, the wireless communication module is not limited to being provided on the inner wall 10 of the tunnel, and may be provided at various positions, or the like. In such a manner, the feed device 100 (antenna device 100A) can be used as a communication device.

Although the antenna device and feed device according to the illustrative embodiment of the present invention have been described, the present invention is not limited to the embodiment disclosed specifically. Various modifications and changes can be made without departing from the claims.

This International application claims priority to Japanese Patent Application No. 2019-028376, filed Feb. 20, 2019, the contents of which are incorporated herein by reference in their entirety.

REFERENCE SIGNS LIST 100 feed device
110 array antenna
110A to 110D subarray
111 antenna element
120 phase shifter
130 microwave generator
140 camera
141 fisheye lens
150 controller
151 position converting unit
152 elevation-angle acquiring unit
153 control unit

The invention claimed is:

1. An antenna device comprising:
an array antenna with multiple antenna elements that are arranged in two dimensions, the multiple antenna elements being arranged along each of a first axis and a second axis;
at least one phase adjusting unit configured to adjust, with respect to a first axial direction, a phase of power supplied to each of the multiple antenna elements;
an image capturing unit configured to capture an image through a fisheye lens;
a position converting unit configured to convert a first position, which is used in the image capturing unit, of a marker included in the image captured by the image capturing unit, into a second position of polar coordinates on a first plane that includes the first axis and the second axis, the marker being attached to a target to be irradiated with a beam through the array antenna;

an elevation-angle acquiring unit configured to determine, within a second plane that includes the first axis and a third axis, an elevation angle of a projected position relative to the third axis, based on the second position and a geometric relationship between the first position and the projected position, the projected position being obtained by projecting the first position onto the second plane; and a control unit configured to control the phase adjusting unit such that a direction of a beam radiated through the array antenna is derived from the elevation angle within the second plane.

2. The antenna device according to claim 1, wherein the elevation-angle acquiring unit is configured to determine, as the elevation angle, a value obtained by dividing a coordinate of the projected position by a focal length of the fisheye lens, the coordinate of the projected position being obtained by mapping the second position to the first axis.

3. The antenna device according to claim 2, wherein the coordinate of the projected position is expressed with a value obtained by multiplying a radius by a cosine of a deflection angle, the radius and the deflection angle being represented in the polar coordinates.

4. The antenna device according to claim 1, wherein the multiple antenna elements are grouped into multiple subarrays each of which extends along the second axis, and wherein the at least one phase adjusting unit is multiple phase shifters connected to the respective multiple subarrays, each phase shifter being configured to adjust the phase of the power, for each subarray.

5. The antenna device according to claim 4, wherein power having a same phase is supplied to each of given antenna elements included in a same subarray.

6. A feed device comprising:

an array antenna with multiple antenna elements that are arranged in two dimensions, the multiple antenna elements being arranged along each of a first axis and a second axis;

a radio wave generator;

at least one phase adjusting unit provided between the array antenna and the radio wave generator, the phase adjusting unit being configured to adjust, with respect to the first axis, a phase of power that is supplied by the radio wave generator to each of the multiple antenna elements;

an image capturing unit configured to capture an image through a fisheye lens;

a position converting unit configured to convert a first position, which is used in the image capturing unit, of a marker included in the image captured by the image capturing unit, into a second position of polar coordinates on a first plane that includes the first axis and the second axis, the marker being attached to a target to be irradiated with a beam through the array antenna;

an elevation-angle acquiring unit configured to determine, within a second plane that includes the first axis and a third axis, an elevation angle of a projected position relative to the third axis, based on the second position and a geometric relationship between the first position and the projected position, the projected position being obtained by projecting the first position onto the second plane; and a control unit configured to control the phase adjusting unit such that a direction of a beam radiated through the array antenna is derived from the elevation angle within the second plane.

7. An antenna device comprising:

an array antenna with multiple antenna elements that are arranged in two dimensions, the multiple antenna elements being arranged along each of a first axis and a second axis;

at least one phase adjusting unit configured to adjust, with respect to a first axial direction, a phase of power supplied to each of the multiple antenna elements;

an image capturing unit configured to capture an image through a fisheye lens;

a position converting unit configured to convert a first position, which is used in the image capturing unit, of a marker included in the image captured by the image capturing unit, into a second position of polar coordinates on a first plane that includes the first axis and the second axis;

an elevation-angle acquiring unit configured to determine, within a second plane that includes the first axis and a third axis, an elevation angle of a projected position relative to the third axis, based on the second position, the projected position being obtained by projecting the first position onto the second plane; and a control unit configured to control the phase adjusting unit such that an angle of a beam radiated through the array antenna changes within only the second plane, wherein the first axis, the second axis, and the third axis are mutually perpendicular.

* * * * *